(12) United States Patent
Ozerov et al.

(10) Patent No.: US 10,848,568 B1
(45) Date of Patent: Nov. 24, 2020

(54) SYSTEM AND METHOD FOR MANAGING POWER OF REMOTE AND VIRTUAL DESKTOPS

(71) Applicant: Parallels International GmbH, Schaffhausen (CH)

(72) Inventors: Denis Ozerov, Moscow (RU); Stanislav Zinukhov, Moscow (RU); Nikolay Dobrovolskiy, Moscow (RU); Serguei Beloussov, Costa Del Sol (SG)

(73) Assignee: Parallels International GmbH, Schaffhausen (CH)

( * ) Notice: Subject to any disclaimer, the term of this patent is extended or adjusted under 35 U.S.C. 154(b) by 146 days.

(21) Appl. No.: 16/026,112

(22) Filed: Jul. 3, 2018

(51) Int. Cl.
| | |
|---|---|
| *H04L 12/00* | (2006.01) |
| *H04L 29/08* | (2006.01) |
| *H04L 29/06* | (2006.01) |
| *H04L 12/26* | (2006.01) |
| *G06F 1/3209* | (2019.01) |
| *G06F 1/3234* | (2019.01) |
| *G06F 9/54* | (2006.01) |
| *G06F 1/28* | (2006.01) |

(52) U.S. Cl.
CPC .............. *H04L 67/14* (2013.01); *G06F 1/28* (2013.01); *G06F 1/3209* (2013.01); *G06F 1/3234* (2013.01); *G06F 9/547* (2013.01); *H04L 43/10* (2013.01); *H04L 67/26* (2013.01); *H04L 67/32* (2013.01); *H04L 67/42* (2013.01)

(58) Field of Classification Search
CPC ......... H04L 29/06047; H04L 29/08162; H04L 29/08225; H04L 29/08522; H04L 29/0872; H04L 67/1002; H04L 67/1091

USPC ................. 709/203, 220, 223, 227
See application file for complete search history.

(56) References Cited

U.S. PATENT DOCUMENTS

| | | | | |
|---|---|---|---|---|
| 6,304,297 | B1 * | 10/2001 | Swan .................... | G06F 3/1415 345/501 |
| 7,698,575 | B2 * | 4/2010 | Samson ................ | G06F 1/3228 713/300 |
| 8,284,210 | B1 * | 10/2012 | Kumar .................... | G09G 3/20 345/501 |
| 9,256,265 | B2 * | 2/2016 | Huang ................... | G06F 1/3203 |
| 10,402,079 | B2 * | 9/2019 | Ormand ................ | G06F 3/0485 |
| 2003/0014476 | A1 * | 1/2003 | Peterson ............... | G06F 9/4416 709/203 |
| 2008/0055318 | A1 * | 3/2008 | Glen ........................ | G09G 3/20 345/501 |
| 2008/0256370 | A1 * | 10/2008 | Campbell ........... | G06F 11/0709 713/300 |
| 2009/0135918 | A1 * | 5/2009 | Mak-Fan ......... | H04N 21/41407 375/240.28 |

(Continued)

*Primary Examiner* — Frantz Coby
(74) *Attorney, Agent, or Firm* — Rosenberg, Klein & Lee

(57) ABSTRACT

Disclosed are systems and methods for computer power management. In one aspect, a method comprises determining whether a frame rate at a client device is greater than a predetermined threshold value, determining whether the frame rate has remained constant, when the frame rate is greater than the predetermined threshold value and when the frame rate has remained constant, activating a poll mode at the client device, otherwise: activating a push mode at the client device to preserve power at the server, and executing reception of content for display at the client device from the server according to the activated mode.

21 Claims, 7 Drawing Sheets

(56) References Cited

U.S. PATENT DOCUMENTS

| | | | |
|---|---|---|---|
| 2013/0176322 A1* | 7/2013 | Bakalash | G06T 15/005 345/522 |
| 2015/0379665 A1* | 12/2015 | Kwa | G06T 1/20 345/522 |
| 2016/0027142 A1* | 1/2016 | Bakalash | G06T 15/005 345/522 |
| 2017/0109859 A1* | 4/2017 | Singh | G09G 3/20 |
| 2017/0235357 A1* | 8/2017 | Leung | G09G 5/00 713/310 |

* cited by examiner

SYSTEM AND METHOD FOR MANAGING POWER OF REMOTE AND VIRTUAL DESKTOPS

FIELD OF TECHNOLOGY

The present disclosure relates generally to the field of remote desktop power management, and more specifically, to systems and methods for managing power of remote and virtual desktops.

BACKGROUND

In virtual desktop environments, users often login to a remote desktop session, a virtual desktop, or the like without concern for the power being consumed on the server side.

Often, servers that host remote desktop sessions of virtual desktops are configured for power optimization by administrators of the servers, either manually, or dynamically based on trained software. Such power optimizations may be cycling down various servers according to a schedule during a particular time of day, month or year, or alternatively load balancing requests between the servers and the virtual environments.

While power optimization at the server side is powerful and useful, often such power optimization does not take client side activity into account. For example, it would be undesirable for a server hosting a remote desktop session or an inactive virtual desktop session to remain fully powered while the client session is inactive, unused, or the like. Similarly, it would be undesirable for a virtual machine to remain fully powered and operational while a virtual desktop being hosted is inactive, unused or the like. Usually clients select either push or poll methods of receiving frames from a server, when there is a predictable or stable frame rate. For example, gaming or video player applications will generally use the poll mode since the applications provide stable video frame output.

However, in case of virtual/remote machine display output such information is unavailable beforehand. Therefore, the inventors have described herein systems and methods for managing power of remote and virtual desktops by adjusting their configuration based on demand.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

SUMMARY

Figure 1:
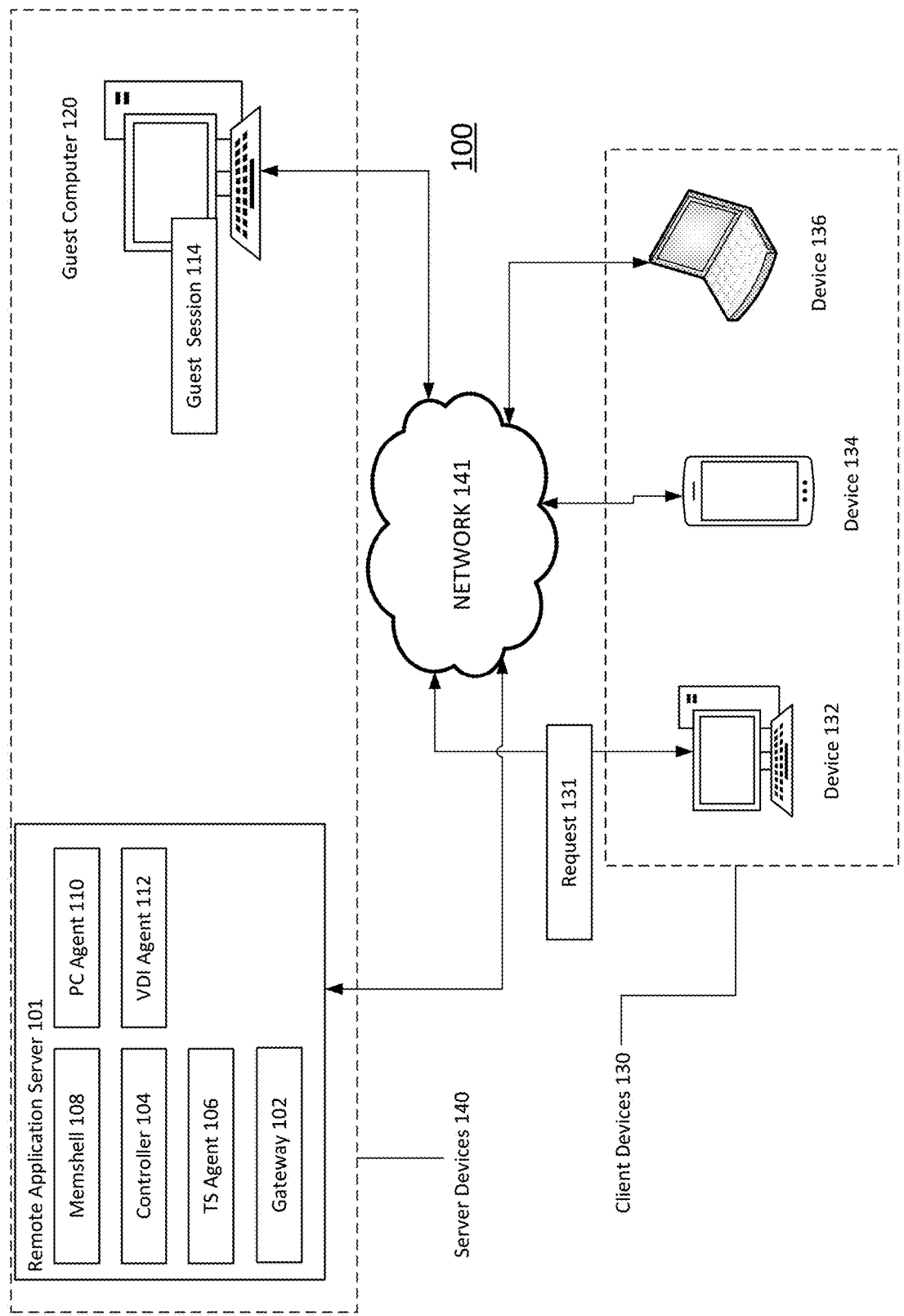
FIG. 1 is a block diagram illustrating example operations of a system according to an exemplary aspect of the disclosure.

Aspects of the present disclosure relate to systems and methods for managing power of remote and virtual desktops. Exemplary aspects of the present disclosure manage computer power consumption.

According to one exemplary aspect, a method is provided for computer power management The method comprises determining whether a frame rate at a client device is greater than a predetermined threshold value, determining whether the frame rate has remained constant, when the frame rate is greater than the predetermined threshold value and when the frame rate has remained constant, activating a poll mode at the client device, otherwise: activating a push mode at the client device to preserve power at the server, and executing reception of content for display at the client device from the server according to the activated mode.

According to another aspect of the disclosure, the method further comprises determining that the server is inactive and activating a poll mode for the client device.

According to another aspect of the disclosure, the content is video output of operations performed on the server.

According to another aspect of the disclosure, the operations comprise a remote desktop session hosted by the server, and wherein the server is a guest computer, a remote application server (RAS), or a virtual machine.

According to another aspect of the disclosure, the method further comprises determining that the poll mode is activated for a predetermined period of time and pausing one or more applications executing on the remote desktop session, wherein the server is the remote application server (RAS).

According to another aspect of the disclosure, the remote desktop session is paused.

According to another aspect of the disclosure, the server is a guest computer, and the guest computer screen has dimmed.

According to another aspect of the disclosure, the method further comprises enabling dimming of a display of the guest computer and shifting time of a guest dimming event to a nearest predefined moment.

According to another aspect of the disclosure, the push mode further comprises writing frames of the content to a shared memory and performing an inter-process communication (IPC) call for server to check and schedule a refresh of a display of the client.

According to another aspect of the disclosure, the poll mode further comprises checking a shared memory at a predetermined frequency and refreshing a display of the client if the shared memory has changed.

According to another exemplary aspect of the present disclosure, a system is provided for managing power of remote and virtual desktops. The system comprises a hardware processor configured to determine a frame rate output from the server of content displayed at a client device, determine whether the frame rate is greater than a predetermined threshold value, determine whether the frame rate has remained constant within a predetermined threshold difference for a period of time, when the frame rate is greater than the predetermined threshold value and when the frame rate has remained constant, activate a poll mode at the client device, wherein in the poll mode the client device polls the server at a frequency specified by the server for updates to the content displayed at the client device, otherwise: activate a push mode at the client device to preserve power at the server wherein in the push mode the client device sends a request to the server to schedule a refresh of the content displayed at the client device; and execute reception of content for display at the client device from the server according to the activated mode.

According to another exemplary aspect, a computer-readable medium is provided comprising computer-executable instructions that when executed, perform any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims

DETAILED DESCRIPTION

Exemplary aspects are described herein in the context of a system, method and computer program product for managing power of remote and virtual desktops. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

FIG. 1 is a block diagram illustrating example operations of a system 100 according to an exemplary aspect.

According to one aspect, the system 100 comprises a remote application server (RAS or server) 101, a guest computer 120 and client devices 130, including a device 132, a device 134 and a device 136, though not limited thereto. The devices 130 may initiate a remote session with the server devices 140 (e.g., either the RAS 101, or the guest computer 120) via network 141. In some aspects, the guest computer 120 may be a MacOS® Windows Server, or any instance of an operating system running in a virtual machine.

Those of ordinary skill in the art will recognize that the network 141 may be a private network, a public network, the Internet, or the like. According to one aspect, each of the client devices comprises a client application which may provide server devices 140 with client information regarding how applications are being displayed at the client. For example, the client information can include the frame rate of video output at the client, state of client windows (e.g., position, overlap, etc.). In some instances, if the frame rate exceeds or meets a predetermined threshold, or an average of the frame rate over a predetermined period of time exceeds or meets a threshold value, the client application will automatically switch the session request mode to a poll mode. If the frame rate does not meet the predetermined threshold, or an average of the frame rate over a predetermined period of time does not meet a threshold value, then either the client switches to a push mode or remains in push mode if the client was already in push mode. In other words, when the frame rate at the client devices 130 drops, push mode is activated by a client application on the client devices so that power consumption can be regulated at the server devices 140. According to one aspect, if client's windows are overlapped or minimized, the framerate can be reduced, activating push mode.

According to some aspects, when there are no running applications on a guest system, the guest system is considered inactive. In this aspect, when the guest system is inactive and is executing in the background, then the poll method will be used by the client to enable energy savings mode at the server devices 140. In another aspect, the VM GUI application at the client can be auto-paused when it is dimmed. According to one aspect of the disclosure, auto-pausing of remote sessions or applications are initiated automatically after a predetermined threshold time of inactivity while the poll mode is activated at the client. In the instance where the server device is guest computer 120, auto-pausing the session reduces CPU utilization by the guest computer 120. In the case where the server device is RAS 101, the terminal (remote) session or virtual desktop can be paused, and may therefore free resources of the RAS 101. In one example, the guest system is paused when there is an absence of application activity within a predetermined period of time.

The remote session may be a remote desktop session hosted by the RAS 101, or a virtual desktop session hosted by a virtual machine. The virtual desktop session is a session that uses a virtual machine that executes its own operating system (OS) and applications. The output images of the OS and applications are transmitted to a client device. A remote desktop session is a remote session initiated with RAS 101 where RAS 101 launches one or more remote applications on RAS 101 and transmits the video output of the applications to a client device. Alternatively, the remote session may be a guest session 114 on guest computer 120, where a client device receives a visual representation of the output of the operating system executing on the guest computer 120, in effect "taking over" the operation of the guest computer 120.

The gateway 102 of the RAS 101 is, in some aspects, any gateway that provides access to a larger network such as the internet or a wide area network (WAN) such as an office intranet. The gateway 102 may be an HTML Gateway which receives application requests to launch applications in a web browser. The gateway 102 may also provide web gateway services such as a portal which provides an application list that launches a native client at the client devices 130. The request 131 is received, via the gateway 102, at the RAS 101, and specifically by the controller 104 of the RAS 101. The controller 104 is a publishing agent which determines what applications are made available to clients 130 and who can use the applications. The terminal server agent (TS Agent) 106 provides virtual desktop resources which are consumed by the published applications. In some instances, the TS Agent 106 may be referred to as a remote desktop session host (RDSH). The PC agent 110 controls remote desktop connections from client devices 150, while the VDI Agent 112 is used by VDI hosts, which are servers on which Hypervisor® is running one or more virtual machines (e.g., guest virtual machines or VMs). Each VM runs an operating system called a guest operating system (guest OS). Thus each agent acts similarly to the TS Agent 106 for different types of hosts.

Figure 2:
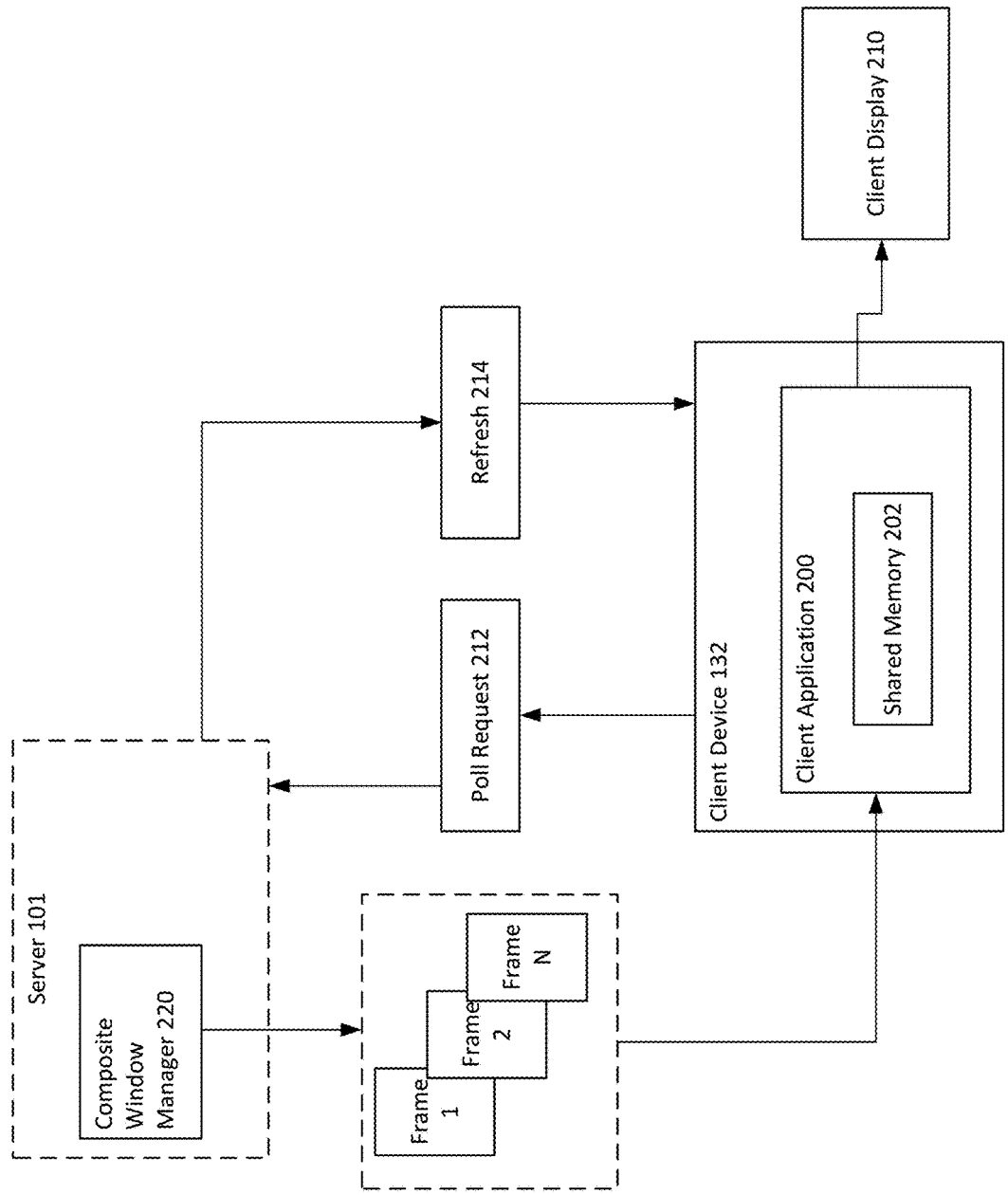
FIG. 2 is a block diagram of the client device in further detail according to an exemplary aspect of the disclosure.

Each of the client devices 130 comprise a client application, shown in more detail in FIG. 2. When a user initiates a remote session with one of the server devices 140, the client application creates a connection via request 131 with one or more of the server devices 140 over a communications channel. Output frames of the application or remote/virtual desktop are delivered to the client via shared memory and/or inter-process communication (IPC), where frames are placed in shared memory. According to one aspect, the communication channel is a remote desktop protocol (RDP) virtual channel. As described above, the client application controls a mode of output at the client device. In one aspect, the modes include a push mode and a poll mode, which may be dynamically chosen and applied based on live parameter of the session. When the client is in push mode, after a client application writes frames to shared memory, an IPC call is performed which requests that the connected server of server devices 140 check and schedule display refresh at the client. When the client is in poll mode, the server sets a scheduling timer for the client application. The client application then checks shared memory according to a predetermined frequency and refreshes the client display if there is a change to the shared memory. In one aspect, the predetermined frequency is 1/60th of a second, though those of ordinary skill in the art will recognize that the predetermined can be adjusted according to server and client needs and constraints.

Push mode of the client application consumes a greater amount of CPU resources at the server than the poll mode because during push mode when the frame rate displayed or received at the client device is higher than during the poll mode. However, when no frames are drawn, or the frame rate is low or below a predetermined threshold, the push mode consumes less resources than during the poll mode. The overconsumption during high-frame rate delivery occurs due to scheduling and IPC overhead. In contrast, the CPU resources consumed at the server is inversely proportional to the frame rate—where an increase in frame rate reduces CPU resources consumed because there is no push mode overhead.

When users at client devices 130 choose to launch a desktop session or one or more applications, the client devices 130 communicates the request 131 to the RAS 101 which may, in one aspect, route the request 131 from gateway 102 to a Remote Desktop Protocol server. In some instances, an RDP server is configured to accept remote desktop session requests such as request 131 via TCP or UDP at port 3389, though other ports may be used.

Via a virtual channel, RAS 101, or a portion of RAS 101 such as the RDP server, passes on the request 131 to the Memshell component (or simply Memshell) 108. Memshell 108 performs the processing and calculations involved in launching the published remote applications. The TS Agent 106 passes configuration settings to Memshell 108 through shared memory. The TS Agent 106 then launches all applications and positions the applications according to previously selected or default layout configurations. The session is then initiated with the client devices 130 via the RAS 101.

As a session persists between server devices 140 and client devices 130, the client application on each of the client devices 130 record throughput and client framerate information such as the framerate at which output of the OS or application is being displayed at the client. The client can then modify a display mode of the frames transmitted to the client in order to reduce power usage at the server.

FIG. 2 is a block diagram of the client device 132 in further detail according to an exemplary aspect of the disclosure.

In this aspect, the client device 132 has initiated a session with RAS 101. The session may be a remote desktop session or a virtual desktop session. The session is initiated over the network and the mode may be defaulted to push mode where the client application 200 writes frames to shared memory 202, and then the client application 200 performs an IPC call which asks the server 101 to check for an updated frame and, subsequently, schedule a refresh for the client display. Alternatively, if the client session is initiated in the background, the client application 200 may default the mode to poll mode, where the server 101 sets a scheduling timer for the client application 200. The client application 200 then checks, periodically according to the timer, the shared memory 202 for a new frame, and refreshes the client display (e.g., composition subtree).

Figure 3:
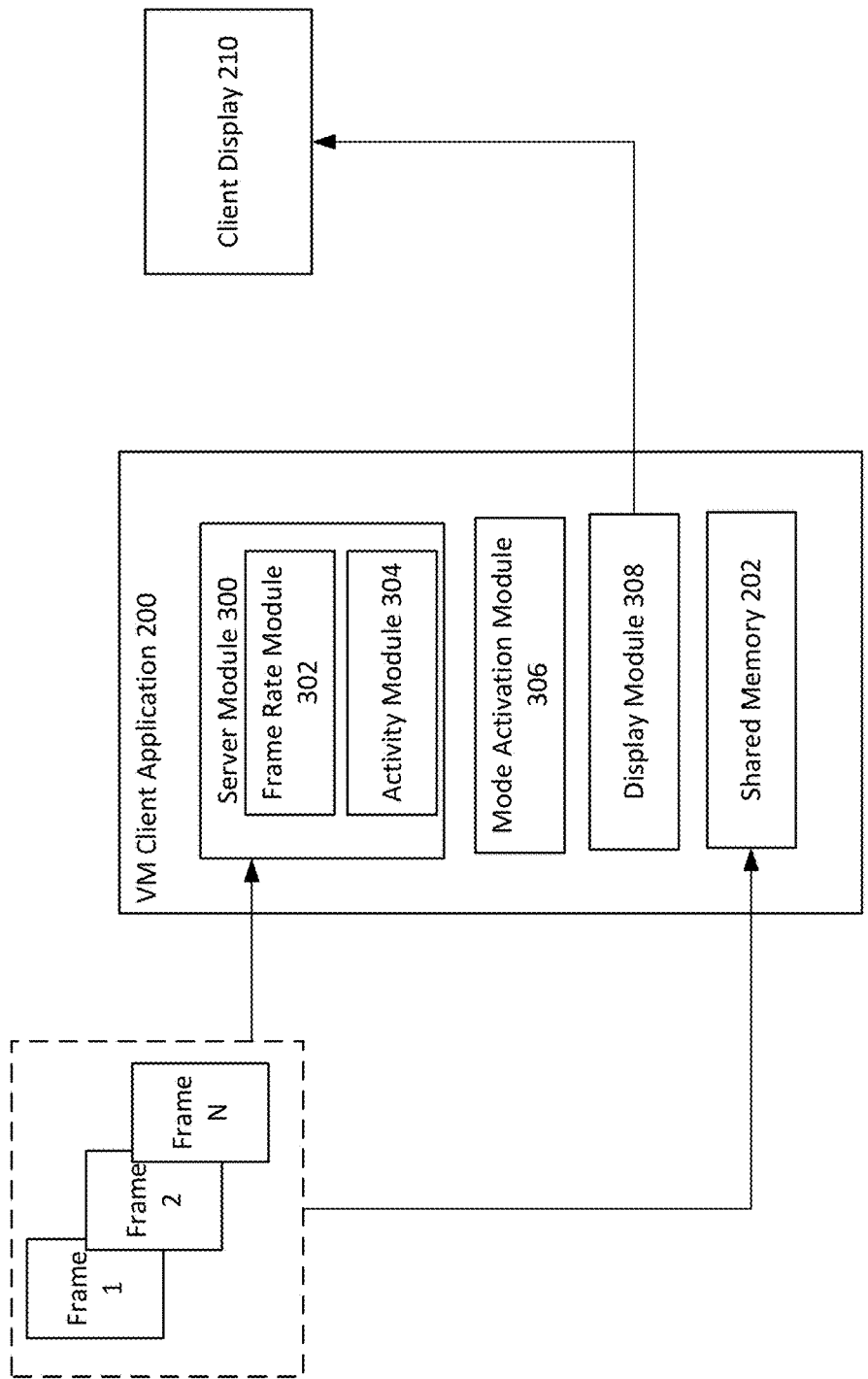
FIG. 3 is a block diagram of the client application in further detail according to an exemplary aspect of the disclosure.

The client device 132 has client application 200 installed or activated thereon. According to one aspect, the client application 200 is a virtual machine graphical user interface (GUI) application. The client application 200 has access to shared memory 202. The client application 200 is shown in further detail in FIG. 3. The client application 200 comprises a server module 300, a mode activation module 306, a display module 308 and shared memory 202. The client device 132 further is coupled to a display 210 which displays a graphical representation of a running remote/virtual desktop or an executing remote application.

In one example, Frames 1 to N are delivered to the server module 300 which stores the frames in shared memory 202 in either mode. The client application 200 selects a mode via the mode activation module 306, the modes including push mode and poll mode. After poll mode activation, the RAS 101 sets a scheduling timer on the server module 300 of the client application 200 to check shared memory 202 for a changed frame. Then, according to a predetermined frequency (e.g., every 1/60th of a second), the client application checks shared memory 202. If a changed frame is found in shared memory 202, the display module 308 of the client application 200 displays the changed frame on display 210, otherwise the display 310 remains unchanged.

However, when the mode activation module 306 of the client application 200 has selected poll mode, the client application 200 communicates Frames 1 to N to server module 300 which writes the frames to shared memory 202 and then issues a poll request 212 to RAS 101. The poll request 212 is a display server check for the RAS 101 to schedule a refresh 214 for client display 210. In some aspects, the schedule for client display is performed by the composite window manager 220, comprising a composition subtree refresh, which refreshes each component beginning from a root display object to the leaf display objects. The display module 308 reads the frames written to shared memory 202 and transmits the frames to the client display 210 for display.

The server module 300 further comprises a frame rate module 302 and an activity module 304. The frame rate module 302 detects the frame rate of the reception (in some aspects, rate of display) of the frames 1 to N. According to one aspect, the frame rate module 302 determines or detects the frame rate of reception of the frames 1 to N. In another aspect, the frame rate module 302 determines the frame rate of display of frames 1 to N to client display 210. The activity module 304 of the server module 300 determines whether the server 101 is active or inactive. For example, if the remote applications are not being used by the user of client device 132, the applications will become inactive, and the activity on the server 101 drops to a base level. In some aspects, the base level of activity includes the server 101 only running those modules or processes which maintain the session between client device 132 and the server 101. In other aspects, the base level means that no window drawing occurs at the client.

Figure 4:
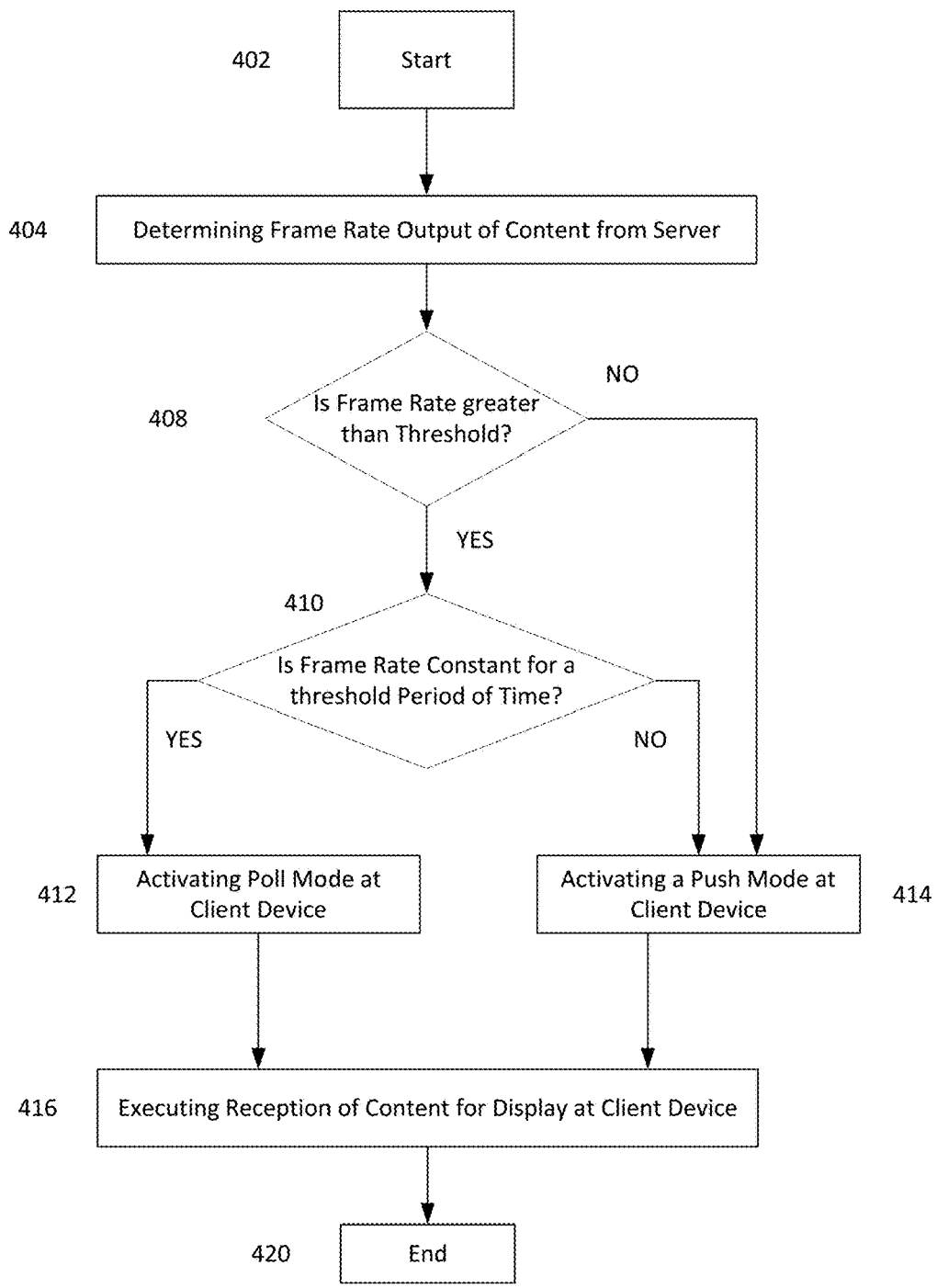
FIG. 4 is a flow diagram for a method for computer power management in accordance with exemplary aspects of the present disclosure.

FIG. 4 is a flow diagram for a method 400 for computer power management in accordance with exemplary aspects of the present disclosure. The client application 200 is an exemplary implementation of the method 400, as executed by a computer system such as described in FIG. 7.

The method 400 begins at step 402 in FIG. 4 and proceeds to step 404. At step 404, the client application 200 determines a frame rate output of content received from a server (e.g., server devices 140).

At 408, the client application 200 determines whether the frame rate is greater than a predetermined threshold. In one aspect, the predetermined threshold is adjustable by a user of the client device, or receives automatic updates from the server devices 140.

If, at 408, it is determined that the frame rate is greater than the threshold value, then the method 400 proceeds to 410. According to some aspects, the threshold value may be $\frac{1}{60}^{th}$ of a second.

At 410, the client application 200 determines whether the frame rate has been constant for a threshold period of time, adjustable by the client or server. If the frame rate is constant (in one aspect, tolerating for a threshold range of variation), the method proceeds to 412, where the client application 200 activates a poll model at the client device (e.g., one of the client devices 132). In one aspect, the threshold period of time is two minutes, though an administrator, user, or system 100 may adjust this according to performance metrics of the system 100. According to aspects of the disclosure, the poll mode comprises the client application receiving a scheduling timer from the server 101. The client application 200 checks the shared memory 202 in accordance with the schedule and updates the display.

If, at 408, it is determined that the frame rate is not greater than the threshold value, then the method 400 proceeds to 414, where a push mode is activated at the client device (e.g., one of the devices 132). As described above, the push mode operates as follows: the client application 200 writes frames to the shared memory 202. The client application 200 then may subsequently performs an IPC call to request that the server check and schedule a display refresh (e.g., composition subtree refresh).

If at 410, the frame rate is not constant for the threshold period of time, the method 400 proceeds to 414, where the client application 200 activates a push mode at the client device (e.g., one of the devices 132).

The method 400 then proceeds to 416, where reception of content for display is executed by the client application according to the activated mode. The method terminates at 420.

Figure 5:
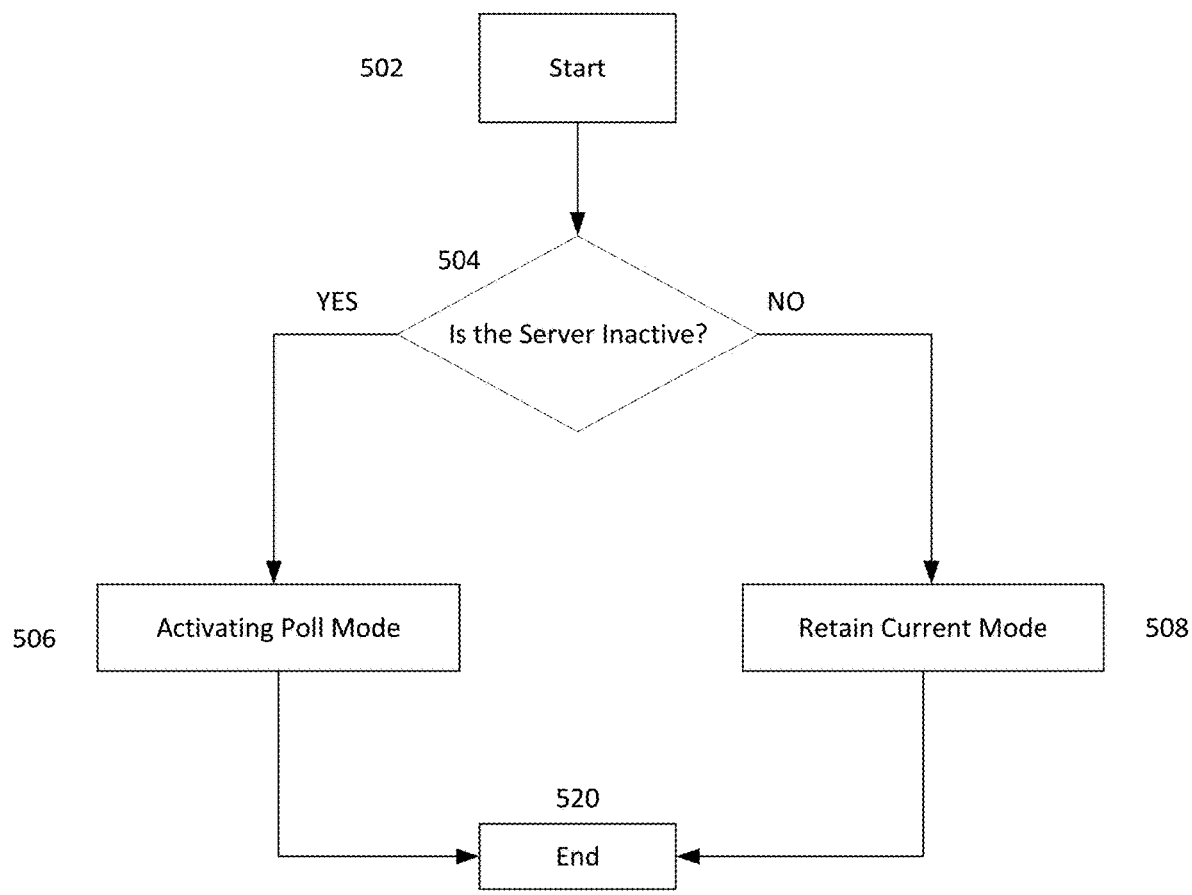
FIG. 5 is a flow diagram for a method for selecting a power management mode in accordance with exemplary aspects of the present disclosure.

FIG. 5 is a flow diagram for a method 500 for selecting a power management mode in accordance with exemplary aspects of the present disclosure. The client application 200 is an exemplary implementation of the method 500, as executed by a computer system such as described in FIG. 7.

The method 500 begins at step 502 in FIG. 5 and proceeds to step 504. At step 504, the client application 200 determines whether the server (e.g. one of the server devices 140 with which the client device has established a connection) is inactive.

If the server is determined to be inactive at 504, the client application 200 activates a poll mode at 506. However, if the server is determined to be active at 504, the method proceeds to 508, where the client application 200 does not switch from whatever mode is currently active. The method terminates at 420.

Figure 6:
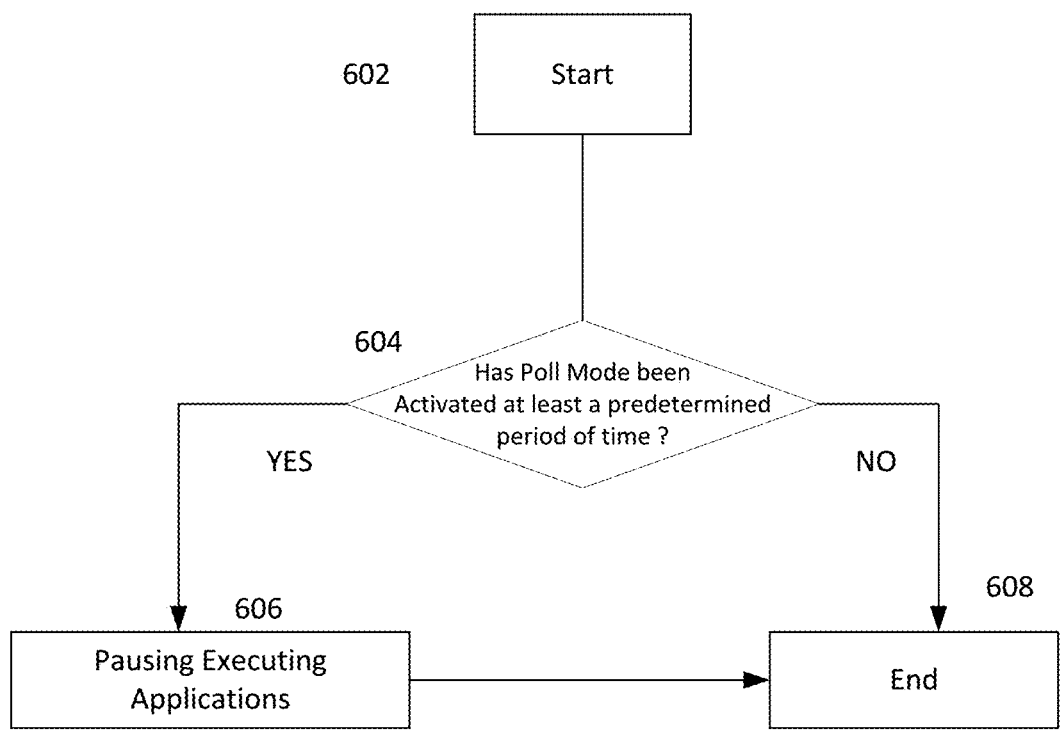
FIG. 6 is a flow diagram for another method for selecting a power management mode in accordance with exemplary aspects of the present disclosure.

FIG. 6 is a flow diagram for another method 600 for selecting a power management mode in accordance with exemplary aspects of the present disclosure. The client application 200 is an exemplary implementation of the method 600, as executed by a computer system such as described in FIG. 7.

The method begins at 602 and proceeds to 604. At 604, the client application determines whether the poll mode has been activated at least for a predetermined period of time. In one aspect, the predetermined period of time is adjusted by an administrator or user of the client device. In another aspect, the predetermined period of time is automatically adjusted based on historical time thresholds and the effects on power consumption and resource preservation.

If poll mode has not been activated for at least a predetermined period of time, the method proceeds to 608, where the method ends.

If poll mode has been activated for at least a predetermined period of time, the method proceeds to 606. At 606, the client application 200 sends a request to the server which is hosting either a remote desktop or a virtual desktop session, to pause any executing remote applications. The method ends at 608.

Figure 7:
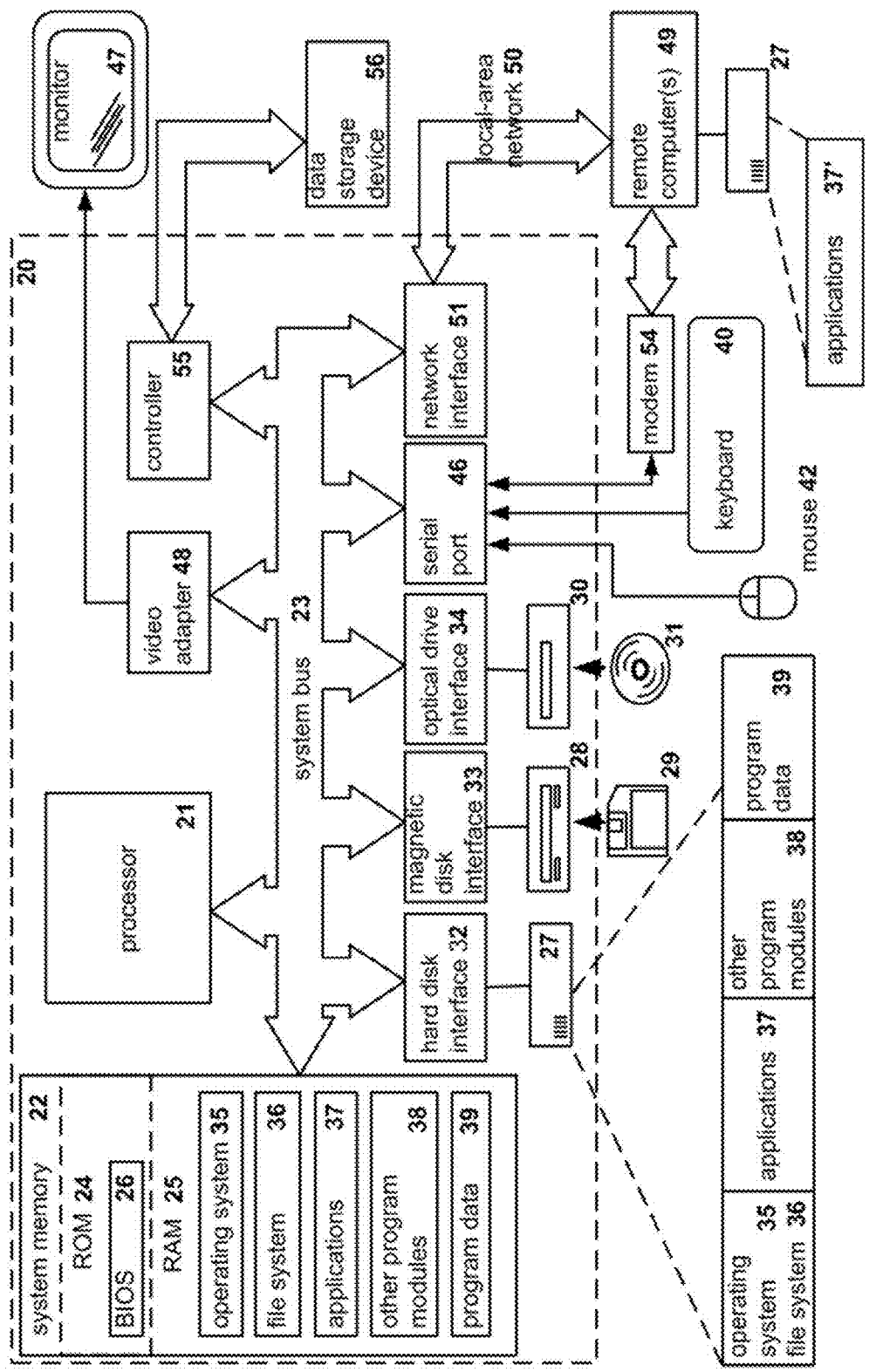
FIG. 7 is a block diagram illustrating a general-purpose computer system on which aspects of systems and methods described above may be implemented in accordance with an exemplary aspect.

FIG. 7 is a block diagram illustrating a general-purpose computer system 20 on which aspects of systems and methods for managing power of remote and virtual desktops may be implemented in accordance with an exemplary aspect. It should be noted that the computer system 20 can correspond to the system 100, each of the client devices 130 or server devices 140, and/or individual components of each, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules.

The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for managing power of remote and virtual desktops comprising:
   determining, by a processor, a frame rate output from a server of content displayed at a client device;
   determining, by the processor, whether the frame rate is greater than a predetermined threshold value;
   determining, by the processor, whether the frame rate has remained constant within a predetermined threshold difference for a period of time;
   when the frame rate is greater than the predetermined threshold value and when the frame rate has remained constant, activating, by the processor, a poll mode at the client device, wherein in the poll mode the client device polls the server at a frequency specified by the server for updates to the content displayed at the client device, otherwise:
   activating, by the processor, a push mode at the client device to preserve power at the server wherein in the push mode the client device sends a request to the server to schedule a refresh of the content displayed at the client device; and executing, by the processor, reception of content for display at the client device from the server according to the activated mode.

2. The method of claim 1, further comprising:
determining that the server is inactive; and
activating a poll mode for the client device.

3. The method of claim 2, wherein the content is video output of operations performed on the server.

4. The method of claim 3, wherein the operations comprise a remote desktop session hosted by the server, and wherein the server is a guest computer, a remote application server (RAS), or a virtual machine.

5. The method of claim 4, further comprising:
determining that the poll mode is activated for a predetermined period of time; and
pausing one or more applications executing on the remote desktop session, wherein the server is the remote application server (RAS).

6. The method of claim 4, wherein the remote desktop session is paused.

7. The method of claim 2, wherein the server is a guest computer, and the guest computer screen has dimmed.

8. The method of claim 7, further comprising:
enabling dimming of a display of the guest computer; and
shifting time of a guest dimming event to a nearest predefined moment.

9. The method of claim 1, wherein the push mode further comprises:
writing frames of the content to a shared memory; and
performing an inter-process communication (IPC) call for server to check and schedule a refresh of a display of the client.

10. The method of claim 1, wherein the poll mode further comprises:
checking a shared memory at a predetermined frequency; and
refreshing a display of the client if the shared memory has changed.

11. A system for managing power of remote and virtual desktops comprising:
a hardware processor configured to:
determine a frame rate output from a server of content displayed at a client device;
determine whether the frame rate is greater than a predetermined threshold value;
determine whether the frame rate has remained constant within a predetermined threshold difference for a period of time;
when the frame rate is greater than the predetermined threshold value and when the frame rate has remained constant, activate a poll mode at the client device, wherein in the poll mode the client device polls the server at a frequency specified by the server for updates to the content displayed at the client device, otherwise:
activate a push mode at the client device to preserve power at the server wherein in the push mode the client device sends a request to the server to schedule a refresh of the content displayed at the client device; and
execute reception of content for display at the client device from the server according to the activated mode.

12. The system of claim 11, wherein the hardware processor is further configured to:
determine that the server is inactive; and
activate a poll mode for the client device.

13. The system of claim 12, wherein the content is video output of operations performed on the server.

14. The system of claim 13, wherein the operations comprise a remote desktop session hosted by the server, and wherein the server is a guest computer, a remote application server (RAS), or a virtual machine.

15. The system of claim 14, wherein the hardware processor is further configured to:
determine that the poll mode is activated for a predetermined period of time; and
pause one or more applications executing on the remote desktop session, wherein the server is the remote application server (RAS).

16. The system of claim 14, wherein the remote desktop session is paused.

17. The system of claim 12, wherein the server is a guest computer, and the guest computer screen has dimmed.

18. The system of claim 17, wherein the hardware processor is further configured to:
enable dimming of a display of the guest computer; and
shift time of a guest dimming event to a nearest predefined moment.

19. The system of claim 11, wherein the push mode further comprises:
write frames of the content to a shared memory; and
perform an inter-process communication (IPC) call for server to check and schedule a refresh of a display of the client.

20. The system of claim 11, wherein the poll mode further comprises:
checking a shared memory at a predetermined frequency; and
refreshing a display of the client if the shared memory has changed.

21. A non-transitory computer-readable medium, storing instructions thereon for managing power of remote and virtual desktops, the instructions comprising:
determining a frame rate output from a server of content displayed at a client device;
determining whether the frame rate is greater than a predetermined threshold value;
determining whether the frame rate has remained constant within a predetermined threshold difference for a period of time;
when the frame rate is greater than the predetermined threshold value and when the frame rate has remained constant, activating a poll mode at the client device, wherein in the poll mode the client device polls the server at a frequency specified by the server for updates to the content displayed at the client device, otherwise:
activating a push mode at the client device to preserve power at the server wherein in the push mode the client device sends a request to the server to schedule a refresh of the content displayed at the client device; and
executing reception of content for display at the client device from the server according to the activated mode.

* * * * *